(12) United States Patent
Salt

(10) Patent No.: US 6,389,085 B1
(45) Date of Patent: May 14, 2002

(54) RECEIVER COMBINER FOR SPATIAL DIVERSITY DIGITAL COMMUNICATIONS

(75) Inventor: J. Eric Salt, Saskatoon (CA)

(73) Assignee: Wavecom Electronics Inc., Saskatoon (CA)

( * ) Notice: Subject to any disclaimer, the term of this patent is extended or adjusted under 35 U.S.C. 154(b) by 0 days.

(21) Appl. No.: 09/007,201

(22) Filed: Jan. 14, 1998

(51) Int. Cl.[7] .................................................. H04L 1/02
(52) U.S. Cl. ...................................... 375/347; 455/136
(58) Field of Search ................................. 375/349, 347, 375/316, 329, 332, 299, 267, 285; 370/208, 209; 455/132, 137, 504, 296, 303, 304

(56) References Cited

U.S. PATENT DOCUMENTS

| | | | |
|---|---|---|---|
| 4,079,318 A | | 3/1978 | Kinoshita |
| 4,349,914 A | | 9/1982 | Evans |
| 5,410,748 A | | 4/1995 | Hayashi et al. |
| 5,430,769 A | | 7/1995 | Patsiokas et al. |
| 5,481,571 A | | 1/1996 | Balachandran |
| 5,499,397 A | | 3/1996 | Waldin et al. |
| 5,510,766 A | * | 4/1996 | Harman et al. ............. 340/552 |
| 5,517,686 A | * | 5/1996 | Kennedy et al. ............ 455/273 |
| 5,550,811 A | * | 8/1996 | Kaku et al. .................... 370/18 |
| 5,561,673 A | | 10/1996 | Takai |
| 5,655,019 A | * | 8/1997 | McKernan et al. ............ 380/6 |
| 5,737,327 A | * | 4/1998 | Ling et al. ................... 370/335 |
| 5,737,433 A | * | 4/1998 | Gardner ..................... 381/94.7 |
| 5,761,252 A | * | 6/1998 | Iinuma ........................ 375/347 |
| 5,787,112 A | * | 7/1998 | Murai ......................... 375/206 |
| 5,889,815 A | * | 3/1999 | Iwakiri ....................... 375/205 |
| 5,982,327 A | * | 11/1999 | Vook et al. .................. 342/380 |
| 6,005,516 A | * | 12/1999 | Reudink et al. ............ 342/375 |
| 6,009,307 A | * | 12/1999 | Granata et al. ............ 455/13.3 |
| 6,070,090 A | * | 5/2000 | Feuerstein .................. 455/561 |

* cited by examiner

Primary Examiner—Chi Pham
Assistant Examiner—Emmanuel Bayard
(74) Attorney, Agent, or Firm—Blake, Cassels & Graydon LLP; Terry L. Leier

(57) ABSTRACT

Apparatus for and method of processing received signals for use with multiple antenna spatial diversity receivers used in a digital communications system. The receiver has received signal phase modulator apparatus for each diversity received signal. The phase modulator provides a two state phase perturbation of zero or pi radians, based on the carrier frequency, which is switched to modulate the phase of the received signal for a fifty percent duty cycle over a symbol period.

14 Claims, 4 Drawing Sheets

RECEIVER COMBINER FOR SPATIAL DIVERSITY DIGITAL COMMUNICATIONS

FIELD OF THE INVENTION

This invention relates to communications systems and in particular to a spatial diversity receiving system for receiving a digitally modulated signal.

BACKGROUND OF THE INVENTION

There are several digital modulation techniques, including BPSK, QAM, (sometimes referred to as QASK), QPSK, which can be demodulated by a delay and multiply operation known as differential detection. In point-to-point and point-to-multi-point communications systems, particularly mobile radio systems, it is known that the medium's channel properties vary over time. These channel variations cause the receiver signal to fade in and out or be subject to intermittent outages. Examples of media or communications channels exhibiting fading properties include electromagnetic signals propagating through the Earth's atmosphere, or undersea acoustic signals.

Signal fading in communications channels is a natural phenomenon that limits the range of separation between the transmitter and receiver. Many very practical and useful channels exhibit fading. The fading in these channels is usually caused by the receiver being linked to the transmitter by more than one propagation path, the lengths of which vary with time. Such channels usually exhibit filing properties terminated Rayleigh fadfing or Rician fading. Fading can also be caused by time varying absorption. For example, the absorption properties of an atmospheric radio channel depend on the moisture content of the atmosphere, which changes over time.

The reception over a channel subject to fading, can be improved by incorporating diversity to reduce the fading and intermittent channel effects that interfere with communications over the channel. There are several diversity options including multiple transmissions using the same communication frequency with each transmission separated in time from the other, which may be termed time diversity; multiple carrier frequencies requiring several different communication frequencies, which may be termed frequency diversity; and multiple antennas or receiving elements with each antenna or receiving element physically separate from the other, which may be termed spatial diversity; etc.

It is well known that the reception of a signal that propagates through a fading or intermittent channel can be improved through the use of spatial diversity. Spatial diversity systems utilize multiple, physically separated, receiving elements in a way that mitigates the fading or intermittent outages experienced by each of the receiving elements. A strong persistent signal, with a much smaller degree of fading, is obtained by properly processing the signals from each of the receiving elements and then properly combining these signals. The strength and persistence of the combined signal depends on the number of receiving elements and the techniques used to process and combine the signals. There is a variety of signal processing and combining techniques that can be used.

One approach to reducing signal fading is to use some form of diversity to receive multiple signals at the receiver and then to combine these signals in a constructive way. A diversity system could involve frequency diversity which is implemented by transmitting identical information on two or more separate carriers that are separated enough in frequency for the fading of each carrier to be uncorrelated with the others. It could involve sending the identical information on the same carrier but at two or more different times with enough separation in time for the fading at each time to be uncorrelated (time diversity). It could also involve sending the information only once, on one carrier and receiving it on two or more separate antennas physically separated with enough distance between them for the fading at each antenna in the receiver to be uncorrelated with the others (spatial diversity).

In all diversity systems the multiple signals have to be combined, which usually involves processing or conditioning each of the multiple signals and then summing or selecting these processed signals. There are different methods for combining the signals, each offering different trade offs between performance and implementation complexity.

Each of the three types of diversity has its advantages and disadvantages. However all three types require a diversity combiner. Spatial diversity has the strong advantage of requiring minimal bandwidth to transmit the information. It has the disadvantage in radio frequency communication of requiring more high frequency circuitry than the others, in particular multiple antennas and associated radio frequency (RF) electronics. Spatial diversity is particularly attractive when the carrier frequency is sufficiently high for the antennas to be implemented as printed circuits. At these frequencies the cost of implementing spatial diversity is the cost of the electronics associated with each antenna.

The theory of spatial diversity and its ability to mitigate fading is well known. To reach the theoretical performance limit requires knowledge of the amplitude and phase of the carrier, which changes with time and can only be estimated. The challenge in achieving near optimal performance is in the implementation of an amplitude and phase estimator and the implementation of the phase and amplitude corrector. There are many techniques for estimating and correcting amplitude and phase and for combining the corrected signals. The various techniques have different degrees of compromise between performance and ease of implementation. Examples of prior art that fall into this category include:

U.S. Pat. No. 4,386,435 to Ulmer providing a space diversity receiver includes an IF band combiner amplifier to sum the IF signals where one signal has a phase corrector which adjusts the phase in response to received signal characteristics. A similar approach is also used in U.S. Pat. Nos. 4,326,294 and 4,710,975 both to Okamoto et al.

U.S. Pat. No. 5,530,925 to Garner combines signals from two physically diverse antennas after down conversion to an intermediate frequency. U.S. Pat. No. 4,498,885 to Namiki combines two spatially diverse signals relying on controlled phase shifting of one of the signals to cancel the effects of an interference wave.

In U.S. Pat. No. 5,203,025 to Anvari et al. the relative phase and amplitude of the IF stage of a spatially diverse receiver are used to determine a signal combining strategy of either direct summation, or inversion then summation, for recovering the modulating signal. A related approach is employed by Karabinis in U.S. Pat. No. 4,373,210 which selects from two spatially diverse signals based on relative signal to interference ratios. The receiver in U.S. Pat. No. 4,079,318 to Kinoshita combines signals from spatially diverse antennas relying on phase control at the intermediate frequency stage.

There are several techniques for combining the signals from multiple antennas to mitigate the effects of fading. These techniques can be logically divided into two categories: post-detection combining and pre-detection combining.

The post-detection combiners essentially require an entire receiver for each antenna but the decision and control circuits remain common. While these circuits can achieve near optimum performance, they are expensive solutions. Pre-detection schemes can also be very complicated and expensive. To achieve near optimum performance requires circuits that estimate the phase of the carrier received at each antenna as well as voltage controlled phase shifter circuits to perform in phase alignment or correction. The purpose of these circuits is to align the phase of the carriers received on each antenna. The implementation cost of such systems is quite high.

A simpler method that yields suboptimum performance can be described as a frequency stacked IF combiner. In this method the carriers from each antenna are translated to separate IF frequencies, with the separation between IF carriers being multiples of the bit rate. The multiplicity of frequency stacked IF signals is summed without regard to phase and then detected. This pre-detection method has the disadvantage of requiring distinct electronics to convert from RF to IF for each antenna, but avoids the need for estimation of carrier phase and amplitude as well as avoids estimating the signal quality. Here the signals from each receiving element are translated to distinct IF bands, the centers of which must be separated in frequency by multiples of the bit rate. The I.F. signals are combined and then detected by a differential detector. This method is described in the paper by T. Masamura, "Frequency Offset Receiver Diversity for Differential MSK", IEEE Trans. Veh. Technol., Vol. VT-36, No. 2, May 1987, pp. 63–70. This technique is referred to as a frequency stacked IF combiner.

SUMMARY OF THE INVENTION

The present invention encompasses a method and preferred embodiment that provides for combining spatial diversity signals.

In accordance with the present invention, diversity signals from receiving elements are combined prior to detection obviating the need for carrier signal recovery or detection prior to modulation signal detection.

In another aspect of the present invention, spatially diverse received signals are directly summed or combined without the need to estimate the phase of the signals from each receiving element, thus eliminating the requirements of the prior art apparatus and methods to obtain phase information and perform phase adjustments prior to combining.

It is yet another aspect of the present invention that spatially diverse received signals are summed or combined without the need to determine or estimate received signal quality of any of the signal receiving elements to effect signal combining thereby eliminating the need to estimate or determine signal strength or bit error rate for each or to any of the received signals.

In yet another aspect of the present invention, a receiver can be implemented using a single down converter to an intermediate frequency (IF) stage providing a significant advantage in receiver construction and economy over receivers requiring multiple IF stage receivers.

The receiver of the present invention includes arrangements including multiple diverse receiving elements and is not limited to two receiving elements.

An object of the present invention is to substantially reduce signal fading in a receiver through the economical implementation of spatial diversity receiving elements.

DESCRIPTION OF THE INVENTION

The present invention includes a method and apparatus to carry out the method and has the advantage of simple implementation. The method comprises perturbing the phase of the carrier of a received signal from a diversity receiving element such that the perturbation of the phase of the carrier is periodic with a period equal to, or a multiple of, the symbol rate. For a plurality of diversity receiving elements, each of the periodic phase perturbations is different. Improved performance in accordance with the invention is obtained when the phase perturbations of the diversity receiving elements are mutually orthogonal over a symbol period. The perturbed phase signals are summed and then detected using a suitable detector. The detector can be, for example, a differential detector.

In a preferred embodiment, binary phase perturbations are applied to each received signal by switching the signal between two circuit paths, one of which has more delay due to extra length. The difference in delay between the two paths is one-half of the carrier cycle. The circuit path switches are controlled by a set of binary functions that are mutually orthogonal over one symbol period (for example, over one data bit interval for coding schemes providing a single bit per symbol) and are each periodic with a common period equal to the symbol period. The binary functions are generated from a square clock using standard logic elements. While there are many sets of binary functions that will work, a set of functions known as Walsh functions are advantageously employed to achieve the advantages of the present invention based on binary phase perturbations.

The present invention discloses a method to combine the signals from each antenna prior to down conversion. In the preferred embodiment, the phase perturber and combiner are placed immediately after the antennas so that only one low noise amplifier is required. In an alternate embodiment, the phase perturber and combiner are placed after a set of low noise amplifiers. Placement of the phase perturber and combiner after low noise amplification of each received signal increases receiver cost but decreases the noise figure of the receiver system.

The method of the invention involves perturbing or modulating the phase of the carriers from each antenna in a periodic manner, without regard for the phase relationship among the carriers received at the different antennas. The method will reduce signal fading as long as the phase of the carriers are perturbed differently and the period of the perturbations is substantially the same as the symbol rate or a multiple thereof. The maximum possible reduction in fading is obtained if the phase perturbations of the carriers are orthogonal providing the magnitude of the perturbation is sufficient.

Theory of Operation

It is believed that the invention works according to the following theory. The invention is not to be limited by the theory, but rather resides in the apparatus and a series of steps comprising the method.

In accordance with the theory, a signal received at any given receiving element i in a plurality of receiving elements as function of time may be expressed as:

$$r_i(t) = A_i \cos(\omega_0 t + \phi_i) \tag{1}$$

where:
$A_i$ is the amplitude of the carrier received at receiving element i
$\omega_0$ is the angular frequency of the carrier
$\phi_i$ is phase in radians of the carrier received at receiving element i. Where the channel linking the receiving element to the transmitter is slowly fading, the carrier amplitude and phase are essentially constant for the duration of two symbols. Thus the phase $\phi_i$ will be substantially constant over 2 successive symbol periods facilitating differential detection.

When receiver diversity is employed, there are signals from N receiving elements which may be summed to produce a combined signal which is given by:

$$s(t) = \sum_{i=1}^{N} A_i \cos(\omega_0 t + \phi_i)$$

The energy of a symbol in the combined signal is given by:

$$E_s = \int_0^T s^2(t) dt \quad \text{where } T \text{ is the symbol period}$$

Substituting for s(t) and expressing the square of a sum as a double sum, the above integral may be used to express the combined symbol energy of all signals from N receiving elements as follows:

$$E_s = \int_0^T \sum_{j=1}^{N} \sum_{i=1}^{N} A_i A_j \cos(\omega_0 t + \phi_i) \cos(\omega_0 t + \phi_j) dt$$

Given the trigonometric identity: cos(a)cos(b)=½[cos(a+b)+cos(a−b)], the previous equation can be expressed as:

$$E_s = \int_0^T \sum_{j=1}^{N} \sum_{i=1}^{N} \frac{A_i A_j}{2} [\cos(2\omega_0 t + \phi_i + \phi_j) + \cos(\phi_i - \phi_j)] dt$$

For communications signals, the carrier frequency is selected to be much, much greater than the symbol rate. This may be expressed mathematically as: $\omega_0 >> 2\pi/T$. Thus, over a symbol period, integration of the term involving $\cos(2\omega_0 t \ldots)$ will go to zero. Changing the order of summation and integration of the foregoing formula and recognizing that for i=j, $\cos(\phi_i - \phi_j) = \cos(0) = 1$, allows $E_s$ to be expressed as:

$$E_s = \sum_{i=1}^{N} \int_0^T \frac{A_i^2 dt}{2} + \sum_{j=1}^{N} \sum_{\substack{i=1 \\ i \neq j}}^{N} \int_0^T \frac{A_i A_j}{2} \cos(\phi_i - \phi_j) dt \quad (2)$$

It is noted that there are two summands provided in this equation. The summand for the single sum is independent of carrier phase and is always positive irrespective of the receiving element i receiving the signal. The summand for the single sum increases with increasing N. Thus, the received signal strength will increase as N increases. While each $A_i$ will vary with time, the probability that all A will be small drastically goes down as N increases.

On the other hand, the summand for the double sum is a function of the received signal carrier phases and could be negative for one or more combinations of i and j. The value of each term in the double sum depends on the phase difference between the respective carrier phases $\phi i$ and $\phi j$. Accordingly, the carrier phases could, and at times would, be such that the double sum could contain a sufficient number of negative terms which provide a sum that completely counteracts the single sum thereby forcing Es to zero, or some value near zero. When Es approaches zero, by definition, signal fading or signal loss results. Therefore, constraining the terms of the double sum to provide a total which approaches zero, will operate to counteract the negative effect the double sum has on the single sum thereby reducing or eliminating fading and signal loss.

Phase modulation apparatus can be provided to modify or adjust the phase of the received signal. This can be done by introducing a time varying delay to the received signal. The received signal represented by equation (1) can be rewritten to include the time varying phase function as follows:

$$r_i(t) = A_j \cos(\omega_0 t + \phi_j + \Psi_i(t))$$

where:

$\Psi_i(t)$ expresses the instantaneous phase adjustment for the signal received at each receiving element i as a function of time where a time varying phase adjustment is introduced.

When the received signal for each receiving element i is individually phase adjusted, it can be shown that the combined symbol energy of all signals from N receiving elements, as previously given in equation (2), can then be represented by:

$$E_s = \sum_{i=1}^{N} \int_0^T \frac{A_i^2 dt}{2} + \sum_{j=1}^{N} \sum_{\substack{i=1 \\ i \neq j}}^{N} \int_0^T \frac{A_i A_j}{2} \cos(\phi_i - \phi_j + \Psi_i(t) - \Psi_j(t)) dt \quad (3)$$

By examination of equation (3), it is observed that by introducing individual phase adjustment of the received signal from each receiving element i, the summand for the double sum becomes a function of both the individual received signal carrier phases, $\phi_i$ and $\phi_j$, and the individual signal phase adjustment functions, $\Psi i(t)$ and $\Psi j(t)$.

The invention comprises utilizing a family of functions, preferably Walsh functions, that may be employed advantageously to provide individual signal phase adjustment which operates to constrain the double sum to approach zero for all permutations of the signal carrier phases $\phi_i - \phi_j$. Use of this family of functions operates to minimize the counteracting effect the double sum has on the single sum thereby reducing or eliminating fading and signal loss.

In accordance with the invention, a family of mutually orthogonal periodic functions has the following properties:

1. A first function has a single output state which is constant, either: high or low, one or zero etc. This can be expressed as follows:

$$f_0 = \begin{cases} 1; & \text{for 100\% of the time; or} \\ 0; & \text{for 100\% of the time} \end{cases}$$

2. For any other order function ($f_1, f_2, f_3 \ldots f_N$), the output state will be high for one-half the time and low for one-half the time. This may be expressed mathematically as follows:

$$f_i = \begin{cases} 1; & \text{for 50\% of the time; and} \\ 0; & \text{for 50\% of the time} \end{cases}$$

3. Between any two higher order functions, over a given time period, the output states of each individual function will be equal one-half the time and opposite one-half the time. This may be expressed mathematically as follows:

$$f_i : f_j = \begin{cases} 0:0; & \text{for 25\% of the time;} \\ 0:1; & \text{for 25\% of the time;} \\ 1:0; & \text{for 25\% of the time; and} \\ 1:1; & \text{for 25\% of the time} \end{cases}$$

The invention provides that such functions be used to produce time varying phase perturbations of the received signal for each receiving element i. The resulting time varying phase perturbation may be expressed as: $\Psi_i(t)$. The differences in the perturbated phases between any two received signals can then be expressed as: $\Psi_i(t)-\Psi_j(t)$. These functions are selected to be periodic over a receiver's symbol period. When such functions are so employed, the individual phase perturbations of each received signal can be expressed as follows:

1. Phase perturbation of a received signal i controlled by function $f_0$ may be expressed as a constant as follows:

$$\Psi_i(t)=\Psi_i \text{ for 100\% of a symbol period, where } \Psi_i \text{ could be 0} \quad (P1)$$

2. Phase perturbation of a received signal i controlled by any function, other than $f_0$, may be expressed as:

$$\Psi_i(t) = \begin{cases} 0; & \text{for 50\% of the time; and} \\ \Psi_i; & \text{for 50\% of the time} \end{cases} \quad (P2)$$

In accordance with the condition specified in P2, the phase perturbation of any individual signal occurs for one-half of the time, or, stated another way, is subject to a fifty percent duty cycle. For the other one-half of the time, no phase adjustment of the signal occurs.

3. Phase perturbation phase differences between a received signal i having a phase perturbation controlled by $f_0$ and any other received signal j having a phase perturbation controlled by a function which is not $f_0$, may be expressed as:

$$\Psi_i(t) - \Psi_j(t) = \begin{cases} \Psi_i; & \text{for 50\% of a symbol period} \\ \Psi_i - \Psi_j; & \text{for 50\% of a symbol period} \end{cases} \quad (P3)$$

4. Phase perturbation phase differences between any two signals i and j each having phase perturbations controlled by different functions, neither of which is $f_0$, may be expressed as:

$$\Psi_i(t) - \Psi_j(t) = \begin{cases} 0; & \text{for 25\% of a symbol period (a)} \\ \Psi_i; & \text{for 25\% of a symbol period (b)} \\ -\Psi_j; & \text{for 25\% of a symbol period (c)} \\ \Psi_i - \Psi_j; & \text{for 25\% of a symbol period (d)} \end{cases} \quad (P4)$$

In accordance with the condition specified in P4, the phase perturbation between any two phase perturbed signals has 4 possible outcomes each of which occurs equally, exactly 25% of the time in one symbol period. Condition P2 still applies to each individual signal and requires each to be phase perturbed for one half of the time. In other words, subject to a fifty percent duty cycle. Condition P4 requires that the phase perturbation between any two signals be mutually absent for twenty-five percent of the time, mutually present for twenty-five percent of the time, and present in one but not the other for twenty-five percent of the time and present in the other but not the one for twenty-five percent of the time. For the purposes of the invention herein described, any two binary functions are said to be mutually orthogonal when they meet the requirements of condition P4.

Without loss of generality, it can be assumed that function $\Psi_1(t)$, which represents the phase adjustment of a first received signal (i.e. i=1), is a constant corresponding to function $f_0$. Accordingly, $\Psi_1(t)=\Psi_1$. This meets the requirements of the condition expressed in equation P1. Further, and again without loss of generality, it can be assumed that $\Psi_2(t)$ through $\Psi_N(t)$, which represent the phase adjustment of the second through N received signals, is given by the functions $f_1, f_2, \ldots, f_{N-1}$. Accordingly, $\Psi_i(t)=\Psi_i$ for 50% of a symbol time and $\Psi_i(t)=0$ for 50% of a symbol time. This meets the requirements of the condition expressed in equation P2.

Based on the simplifying assumptions of the previous paragraph, and incorporating the individual received signal phase perturbations defined by equations P3 and P4, the double sum summand expressed in equation (3) can be expressed as:

$$E_\phi = 2\sum_{j=2}^{N} \int_0^{\frac{T}{2}} \frac{A_1 A_j}{2}[\cos(\phi_1 - \phi_j + \Psi_1) + \cos(\phi_1 - \phi_j + \Psi_1 - \Psi_j)]dt + \qquad (4)$$

$$\sum_{j=2}^{N} \sum_{\substack{i=2 \\ i \neq j}}^{N} \frac{A_i A_j}{2} \int_0^{\frac{T}{4}} [\cos(\phi_i - \phi_j) + \cos(\phi_i - \phi_j + \Psi_i) +$$

$$\cos(\phi_i - \phi_j - \Psi_j) + \cos(\phi_i - \phi_j + \Psi_i - \Psi_j)]dt$$

where $E_\phi$ is used as a symbol for the phase dependent double sum term, being the second summand or double sum of equation (3)

Given the trigonometric identity:

$$\cos(a+\pi)=\cos(a-\pi)=-\cos(a), \qquad (5)$$

it will be understood that the carrier phase dependent term, $E_\phi$ of equation (4), is forced to zero for any value of $\Psi_1$ if:

$$\Psi_i=\pi \text{ for } i=2, \ldots, N$$

For clarity, substitution of $\pi$ for $\Psi_i$ in equation (4) results in:

$$E_\phi = 2\sum_{j=2}^{N} \int_0^{\frac{T}{2}} \frac{A_1 A_j}{2}[\cos(\phi_1 - \phi_j + \Psi_1) + \cos(\phi_1 - \phi_j + \Psi_1 - \pi)]dt +$$

$$\sum_{j=2}^{N} \sum_{\substack{i=2 \\ i \neq j}}^{N} \frac{A_i A_j}{2} \int_0^{\frac{T}{4}} [\cos(\phi_i - \phi_j) + \cos(\phi_i - \phi_j + \pi) +$$

$$\cos(\phi_i - \phi_j - \pi) + \cos(\phi_i - \phi_j + \pi - \pi)]dt$$

Performing the substitutions of the trigonometric identity given in equation (5) results in:

$$E_\phi = 2\sum_{j=2}^{N} \int_0^{\frac{T}{2}} \frac{A_1 A_j}{2}[\cos(\phi_1 - \phi_j + \Psi_1) + \cos(\phi_1 - \phi_j + \Psi_1)]dt + \qquad (6)$$

-continued $$\sum_{j=2}^{N}\sum_{\substack{i=2\\i\neq j}}^{N}\frac{A_iA_j}{2}\int_0^{\frac{T}{4}}[\cos(\phi_i-\phi_j)-$$

$$\cos(\phi_i-\phi_j)-\cos(\phi_i-\phi_j)+\cos(\phi_i-\phi_j)]dt$$

By inspection of either equation (4) or (6), it is further understood that $E_\phi$ is forced to zero for any values of $\Psi_1$. Thus, with $\Psi_i=\pi$ for i=2, 3, ... N, the cosine terms in the integrands sum to zero. This makes the integrals for all i, j equal to zero and thereby forces $E_\phi$ to zero. This is the desired objective.

A preferred embodiment of the present invention will now be described with reference to the drawings in which like features of the invention bear like reference numerals throughout the various figures.

DESCRIPTION OF THE PREFERRED EMBODIMENT

Figure 1:
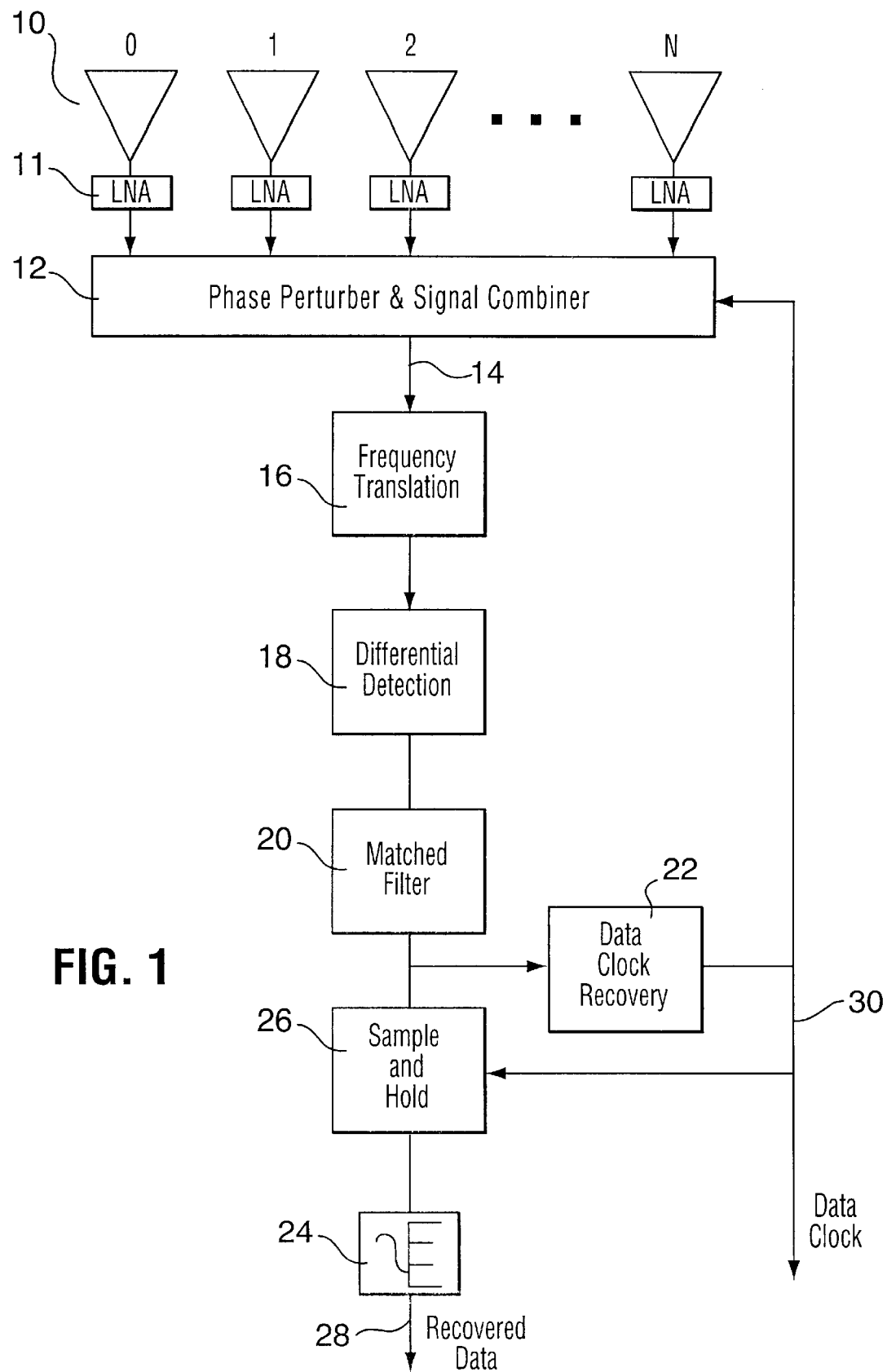
FIG. 1 is a functional block diagram of a first embodiment of a spatial diversity receiver in accordance with the invention.
Figure 2:
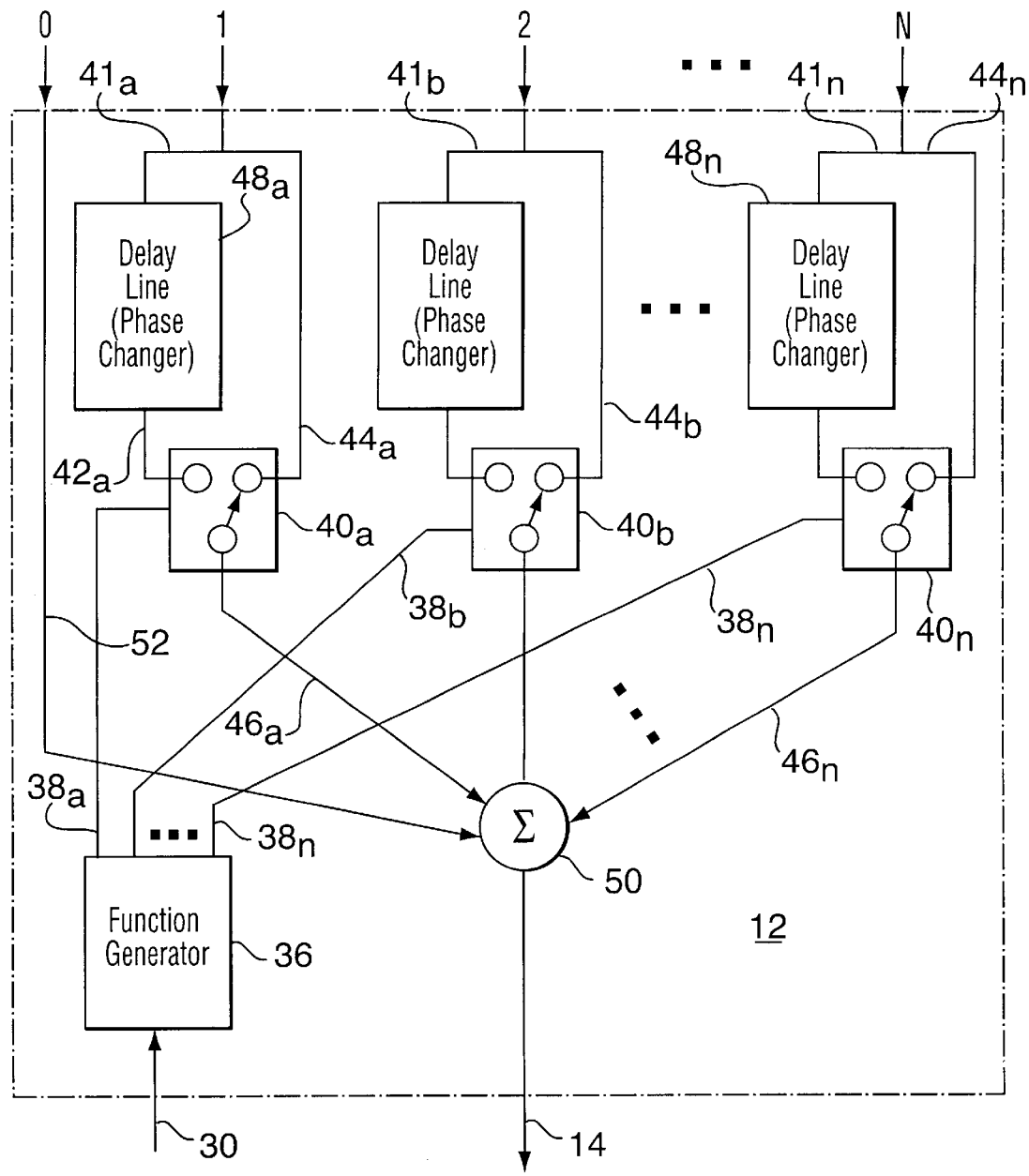
FIG. 2 is a functional block diagram of the phase perturber and signal combiner of FIG. 2.
Figure 3:
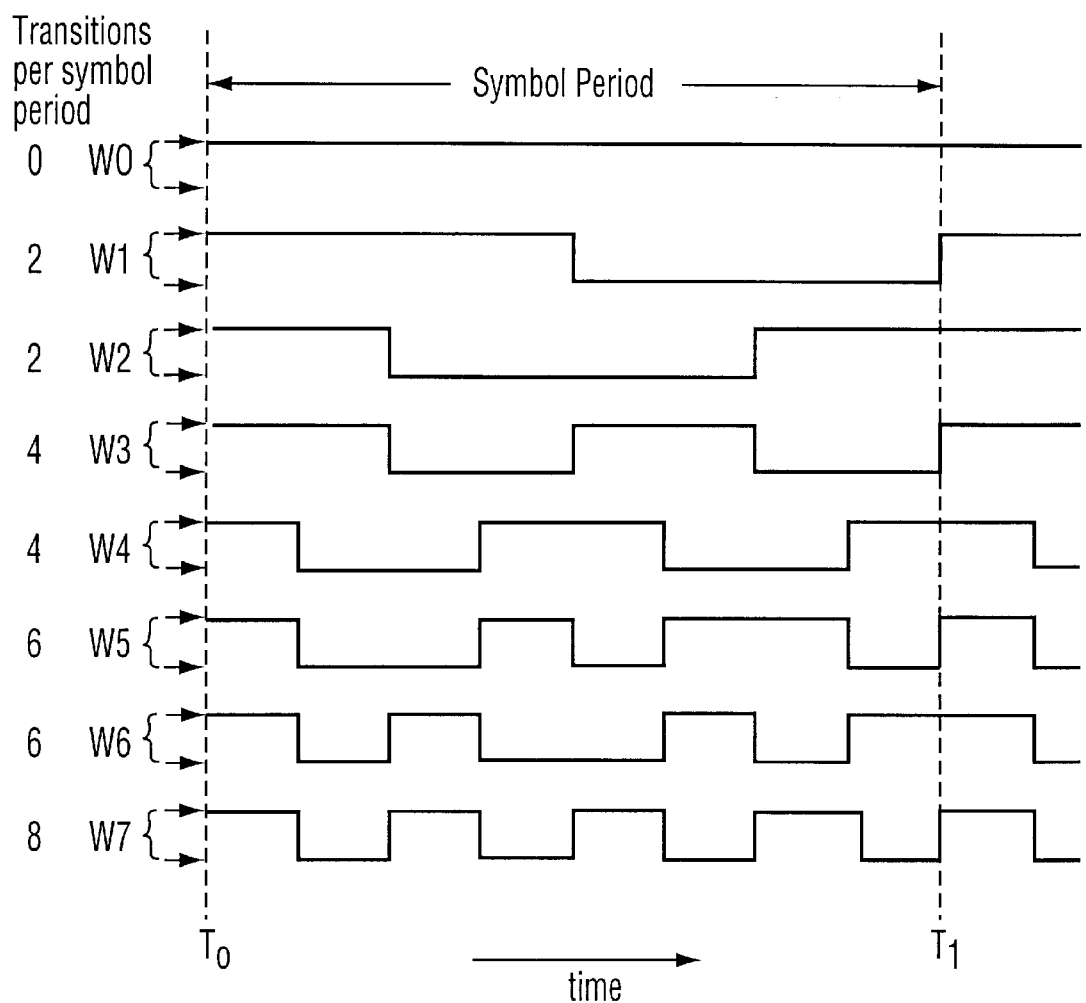
FIG. 3 shows timing diagrams for clocking phase perturbations for up to 8 diversity receiver signals.

Reference is made to FIG. 1 which shows a functional block diagram of a spatial diversity receiver incorporating a phase perturber and signal combiner of the present invention. A plurality of receiving elements 10 is provided, individually numbered for convenience as: 0, 1, 2, 3, ... N. It will be understood that a two antenna spatial diversity receiver will employ two antennas, a three antenna spatial diversity receiver three antennas and so on. Each of the individual antennas or receiving elements is physically displaced from one another to provide a received signal on each receiving element that does not correlate to or has minimal correlation with the signal received on any other receiving element. That is to say, each received signal has a small probability of simultaneously fading with another signal. The general case is shown in FIGS. 2 and 3 where N receiving elements are depicted. The output from each receiving element 10 is supplied to a phase perturber and signal combiner 12 which processes the signal in accordance with the invention as more particularly described with reference to FIG. 2. Each signal is received on a receiving element and may be amplified prior to being supplied to the phase perturber and signal combiner using a suitable low noise amplifier (LNA) 11 to reduce the adverse effects of switching noise introduced by combiner 12. The use of individual LNA 11 for each receiving element is optional and will depend on the constraints (e.g. transmitter power, battery energy consumption etc.) inherent in the nature of the application in which a receiver, in accordance with the invention, is to be used. Whether the received signal is amplified upstream or downstream from the combiner 12 does not affect the principles of operation of the present invention. However, amplifier placement upstream of the phase perturber and signal combiner 12, as depicted in FIG. 1, will decrease the effects of switching noise and improve the noise figure of merit for the receiver.

The conditioned signal output from the phase perturber and signal combiner 12 in accordance with the invention is provided on line 14. The output conditioned signal is subsequently processed by the receiver in a conventional manner to recover the data encoded in the transmitted signal. It will be understood that the signal processing required to recover the transmitted data will depend on the nature of the encoding of that data which was carried out at the transmitter. An exemplary receiver detector system is shown in FIG. 1 for processing the conditioned signal appearing at line 14.

In radio frequency (RF) systems, RF processing generally includes a frequency translation stage 16 to translate the conditioned signal to an intermediate frequency for data recovery. For digital radio communications, there are generally two types of detectors, coherent detectors and non-coherent detectors. The differential detector is a non-coherent type of detector. The following example provides a summary description for a receiver based on differential detection which is employed to detect symbols encoded without the need to recover a carrier signal as part of the symbol detection process. Following frequency translation at the frequency translation stage 16, the frequency translated signal is provided to a differential detector 18 to recover the data signal from the frequency translation stage. The output of the differential detector 18 is supplied to a matched filter 20 which operates co-operatively with the differential detector to produce an output level representative of the recovered symbol. It will be understood by those skilled in the art that the form of the matched filter and differential detector pair will naturally depend on the nature of the coding scheme employed for transmitting the information over the radio channel. Any suitable digital differential coding scheme may be readily used in conjunction with the signal processing and apparatus of the present invention and may include, by way of illustration and exemplification such schemes as BPSK, QAM (or QASK as it is often called) and QPSK among others. Similarly, the signal combining and phase perturbation teachings of the present invention may also be employed in coherent detector transmission schemes. However, persons skilled in the art will appreciate that the carrier recovery apparatus of the receiver will need to contend with the phase perturbations introduced by the signal combiner and perturber 12 thus requiring multiple carrier recovery circuits. Notwithstanding this, the present invention may be economically and advantageously employed for coherent detectors relying on embedded pilot signals, such as are employed in spread spectrum transmission systems for example.

The output from the matched filter 20 is supplied to a data clock recovery circuit 22 and a sample and hold circuit 26. The data clock recovery circuit 22 is used to recover a data clock signal from the received signal to synchronize with transmitter symbol encoding to facilitate symbol recovery by the receiver. The recovered data clock signal is supplied by clock line 30 for use in bit recovery in the receiver and also to provide the symbol period to drive phase perturber and signal combiner 12. In addition to providing a signal for clock recovery, the matched filter 20 output is provided to a sample and hold circuit 26 which samples the output signal at the appropriate time, based on the coding scheme and detector used, to produce a receiver estimate of the transmitted symbol. The appropriate time for filter sampling is determined by the data clock recovery clocking and, as is well known to those skilled in the art, is preferably done near the end of the symbol time.

The sampled output is then provided to a quantizer 24 which is a decision box form of circuit, sometimes referred to as a discriminator. Quantizer 24 performs a quantization of the sampled signal to produce a recovered data output 28 that conforms to the bit encoding of the symbol in accordance with the transmission scheme employed. For example, a binary symbol providing for one bit of data per symbol might employ a threshold detector to discriminate between a positive or negative sampled signal to produce a normalized level output on recovered data line 28 representative of a 1 or a 0. Multi-bit symbol encoding schemes would similarly provide outputs representative of the 2-bit, 3-bit, n-bit bit tuples encoded in the symbol.

FIG. 2 shows a functional block diagram of the elements of the phase perturber and signal combiner 12 of FIG. 1. For simplicity, the received signal amplifiers (LNAs 11) have not been shown. However, it will be understood that signal pre-amplification can occur for each individual signal supplied by receiving element 0, 1, 2, 3, . . . N. That is to say, pre-amplification of each individual signal, if done, is performed before the signal is supplied to the phase perturber and signal combiner 12.

Data clock line 30 is supplied to an orthogonal function generator 36, for example a Walsh function generator, which includes a clock multiplier to create a symbol synchronous clocking signal that is a multiple of the data clock. The function generator 36 internal clock multiplier receives a recovered data clock signal on line 30 which is used to create multiples of the recovered clock. Function generator 36 produces output clocking signals on control lines 38*a*, . . . 38*n* to control corresponding signal path selection switches 40*a*, 40*b*, . . . 40*n*. The number of output clocking signals produced by function generator 36 will depend on the number of diversity receiving elements disposed in the receiver embodiment. The function generator output clocking signal for any individual path switch 40*a*, 40*b*, . . . or 40*n* is explained with reference to the clock timing diagrams of FIG. 3 and description accompanying that figure. The multiplied clock signal is used to produce mutually orthogonal function outputs (e.g. Walsh functions) on each control line 38$_N$ that is used to control signal path selection switches 40$_N$. For generality, N receiving elements have been depicted in the phase perturber and signal combiner 12. However, it will be understood that if there are only 2 receiving elements then receiving lines 0 and 1 will be all that are employed. Similarly, for additional received diversity signals, additional outputs from function generator 36 will be used to supply control signalling to signal selection switches 40$_N$ as dictated by the number of diversity receiving elements contained in the receiver.

The signal received from an individual antenna is split between a phase adjusting or delay path 41$_N$ and a direct path 44$_N$. Delay path 41$_N$ is provided to a delay line or phase changer 48$_N$ which produces an output signal on line 42$_N$ that is delayed by ½ cycle of the carrier frequency. Put another way, the phase of the carrier of the signal on line 42$_N$ is shifted by pi radians. Signal selection switch 40$_N$ is used to select between a delayed or phase shifted signal from path 42$_N$ or a direct signal from path 44$_N$ for output on line 46$_N$. The output selected from either path is selected in accordance with the selection controlled by control line 38$_N$. The delay path 42$_N$ provides the received signal which is delayed by $1/(2f_o)$ seconds by a delay line implementation of phase changer 48$_N$, where $f_o$ is the carrier frequency. Thus, the signal delay introduced by delay line 48$_N$ corresponds to a carrier phase shift of $\pi$ radians. There are varied apparatus which may be advantageously employed to provide phase modulating means 48$_N$ in accordance with the invention. A simple inverting amplifier may be readily employed as a phase changer. The inverting amplifier can have unity gain, or may be arranged to provide amplitude amplification of the received signal depending on the requirements of the application. Any changes to the amplitude of the signal passing through For carrier frequencies that economically admit to it, a longer path may be switched with a shorter path to provide the necessary phase delay. For example, at a carrier frequency in the 5 gigahertz range, two paths which vary in length by a distance of 5 cm may be used to provide a phase shift in accordance with the invention.

The circuit switching effected by signal selection switch 40$_N$ can be implemented using an arrangement of switching diodes or switching transistors as is well known to those skilled in the art. The output selected by signal selection switch 40$_N$ is supplied on line 46$_N$ to summing circuit 50. Summing circuit 50 can be implemented as, for example, an operational amplifier.

Function generator 36 will produce from 1 to N−1 outputs where N represents the total number of receiving elements or antennas of the receiver. In the preferred embodiment, where the receiver has 2 antennas, function generator 36 is arranged to provide one output line 38*a*. It will be appreciated that an alternate configuration, which is not the preferable configuration but is a working configuration, has the first antenna signal perturbed by W1 (shown in FIG. 3) and the second by W2 (of FIG. 3) or the first by W3 (of FIG. 3) and the second by W$_N$ or all or any of these variations. While such a configuration operates in accordance with the invention, the least cost and, therefore, preferable configuration is to avoid path switching one of the receivers. Naturally, If there are fewer than 2 antennas, then the spatial diversity is not provided in the receiver and there is no need to have a function generator 36.

Figure 2A:
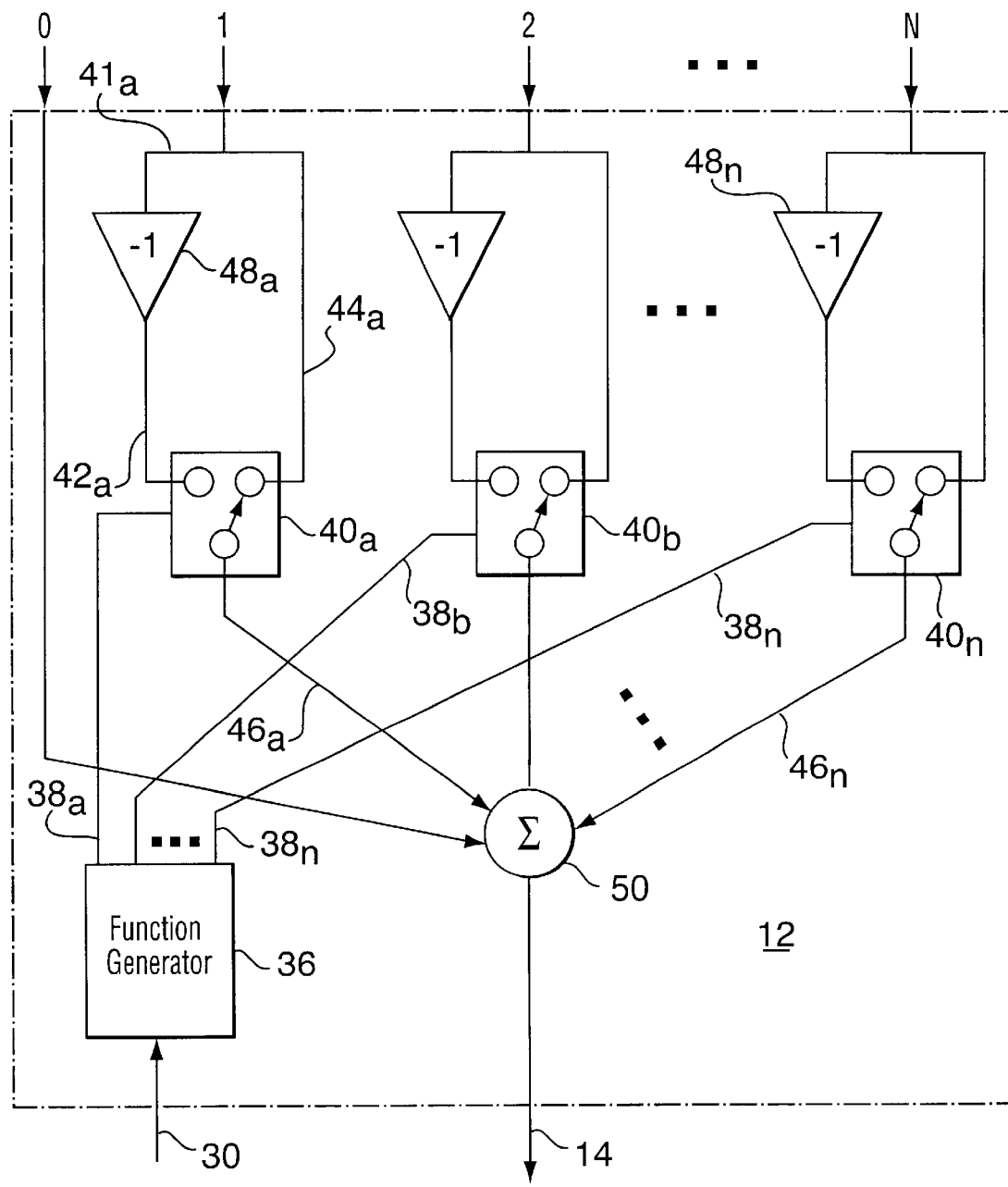
FIG. 2a is a functional block diagram of an alternate embodiment the phase perturber and signal combiner of FIG. 2.

FIG. 2*a* shows an alternate embodiment of the phase perturber and signal combiner of FIG. 2. In this embodiment, all signal lines 1, 2, . . . N from the receiving elements are connected to an associated switched delay line 48$_N$ in contrast to the embodiment shown in FIG. 2 which has one line 52 that directly connects to summer 50. The alternate embodiment in this figure is depicted to illustrate that the invention does not require one receiving element to be directly connected to the summer 50 to operate. From another aspect, it will be appreciated that this configuration of antennae 1, 2, . . . N and switching elements 40$_N$ can be operated by function generator 30 in such a fashion that one of the antenna, for example antenna 1, is connected to summer 50 without ever switching in the associated phase changer 48*a*. In this manner of operation, the configuration of FIG. 2*a* is operationally identical to that of FIG. 2.

Referring to FIG. 3, timing diagrams for eight orthogonal outputs of function generator 36 in FIGS. 2 and 2*a* are shown. The function generator outputs have symbol period transitions at the rate noted in the column "Transitions per symbol period". The symbol period for the receiver is the span represented between the dotted lines T$_0$ and T$_1$ during which time interval a single symbol will arrive at the receiver. During that symbol period, the control line 38*a* corresponding to the receiving element 1 (of FIGS. 2 and 2*a*) will undergo the transition clocking as shown for wave form W1. The control line for receiver element 3 controlled by output on control line 38*b* is shown as trace W2, and so on for each of the 8 traces shown in FIG. 2.

The timing diagrams depicted in FIG. 3 are derived from with the characteristics of the mutually orthogonal functions described previously as expressed in equations P1, P2, P3 and P4 and the preferred functions are Walsh functions. The timing line traces of FIG. 3 may be expanded to higher orders, if required, by referring to a more general statement of the requirements necessary of the functions which is provided in the conditions outlined in formulas P1, P2, P3 and P4. The timing diagrams depicted in FIG. 3 are used to control the control switches $40_N$ of FIGS. 2 and 2a. For each receiving element $0, 1, 2, 3, \ldots N$, the carrier phase provided to summing circuit 50 is perturbed by associated delay line $48_N$ switched in and out by control switch $40_N$, and the switching is controlled by control line $38_N$ which is operated by using a driving function output selected from FIG. 3. The phase perturbation varies as a function of time and is given by:

$$\Psi_i(t) = \begin{cases} 0; & \text{switch on right contact} \\ \dfrac{1}{2f_0} \text{ seconds}; & \text{switch on left contact} \end{cases}$$

where $f_0$ is the carrier frequency. In FIG. 3, the time between $T_0$ and $T_1$ is selected to be a symbol time interval, or symbol period and the control function outputs are mutually orthogonal over that time period.

The traces in the timing diagram of FIG. 3 comply with the conditions defined by equations P1, P2, P3 and P4. Condition P1 applies only to a special case function which is a constant. Condition P3 applies to a special case which is the comparison of a higher order function with the constant function of condition P1 and, as such, is a specific restatement of the more general condition expressed in P2. Condition P2 is satisfied by each trace of the timing diagram where each trace is high or one for one-half of the time and low or zero for one-half of the time. The requirement of conditions P2 and P3 that there be an exact balance of output values between the high condition and low condition may be referred to as a fifty percent duty cycle requirement. The fifty percent duty cycle requirement is necessary to obtain mutual cancellation of the first and second cosine terms provided in the first summand term of $E_\phi$ given in equations (4) and (6). By inspection of the traces of FIG. 3, it will be seen that the condition defined by equation P4 is met between any two traces depicted in the timing diagrams which may be referred to as the mutual orthogonality requirement. The mutual orthogonality requirement is necessary to obtain mutual cancellation of the four cosine terms provided in the second summand term of $E_\phi$ given in equations (4) and (6).

For clarity, the following table illustrates that waveform W7 complies with condition P4 for each other waveform depicted namely: W1, W2, W3, W4, W5 and W6. To facilitate preparation of the table, the symbol period is divided into 8 time slots numbered 1 through 8 corresponding with the timing indicated by waveform W7. A high value of each waveform is depicted in the table as the value one and a low value of each waveform is depicted in the table as the value zero. The waveform value pairs (a), (b), (c) and (d) correspond to the I and j function value pair labels provided in equation P4 and are shown in the comparison row provided below each waveform pair being compared.

TABLE 1

| Waveform | Symbol Time Slot | | | | | | | |
|---|---|---|---|---|---|---|---|---|
|  | 1 | 2 | 3 | 4 | 5 | 6 | 7 | 8 |
| W7 | 1 | 0 | 1 | 0 | 1 | 0 | 1 | 0 |
| W6 | 1 | 0 | 1 | 0 | 0 | 1 | 0 | 1 |
| W7 to W6 | (d) | (a) | (d) | (a) | (b) | (c) | (b) | (c) |
| W7 | 1 | 0 | 1 | 0 | 1 | 0 | 1 | 0 |
| W5 | 1 | 0 | 0 | 1 | 0 | 1 | 1 | 0 |
| W7 to W5 | (d) | (a) | (b) | (c) | (b) | (c) | (d) | (a) |
| W7 | 1 | 0 | 1 | 0 | 1 | 0 | 1 | 0 |
| W4 | 1 | 0 | 0 | 1 | 1 | 0 | 0 | 1 |
| W7 to W4 | (d) | (a) | (b) | (c) | (d) | (a) | (b) | (c) |
| W7 | 1 | 0 | 1 | 0 | 1 | 0 | 1 | 0 |
| W3 | 1 | 1 | 0 | 0 | 1 | 1 | 0 | 0 |
| W7 to W3 | (d) | (c) | (b) | (a) | (d) | (c) | (b) | (a) |
| W7 | 1 | 0 | 1 | 0 | 1 | 0 | 1 | 0 |
| W2 | 1 | 1 | 0 | 0 | 0 | 0 | 1 | 1 |
| W7 to W2 | (d) | (c) | (b) | (a) | (b) | (a) | (d) | (c) |
| W7 | 1 | 0 | 1 | 0 | 1 | 0 | 1 | 0 |
| W1 | 1 | 1 | 1 | 1 | 0 | 0 | 0 | 0 |
| W7 to W1 | (d) | (c) | (d) | (c) | (b) | (a) | (b) | (a) |

Thus as illustrated, waveform W7 meets condition P4 relative to all other waveforms W1 through W6 inclusive. As will be readily understood, similar comparison tables may be made to compare waveforms:

W6 with W1, W2, W3, W4, W5 and W7

W5 with W1, W2, W3, W4, W6 and W7

W4 with W1, W2, W3, W5, W6 and W7

W3 with W1, W2, W4, W5, W6 and W7

W2 with W1, W3, W4, W5, W6 and W7

W1 with W2, W3, W4, W5, W6 and W7 to confirm that orthogonality condition P4 is met for each of these other waveforms relative to each other. Such further inspection will demonstrate that the waveforms depicted in FIG. 3 meet the requirements of condition P4. Consequently, the four cosine terms of the second summand given in equations (4) and (6) will mutually cancel each other out.

It will be apparent that many changes and variations may be made to the illustrative embodiments, while falling within the scope of the invention and it is intended that all such changes and variations be covered by the claims appended hereto.

The embodiments of the invention in which an exclusive property or privilege is claimed are defined as follows:

1. Received signal processing apparatus for use with a spatial diversity receiver having a first receiving element producing a received signal and at least one physically separated diversity receiving element producing a received diversity signal comprising:

phase perturbation means for each received diversity signal, to modulate the phase of the received diversity signal selectively by a predetermined phase adjustment in response to a control signal, producing a phase perturbed output signal;

switching control means to produce a control signal for each phase perturbation means; and summing means to sum the received signal with all said phase perturbed output signals to produce a combined output signal.

2. A receiver as claimed in claim 1 wherein said switching control means produces control signals that are periodic over a symbol period.

3. A receiver as claimed in claim 1 wherein said switching control means produces mutually orthogonal control signals.

4. A receiver as claimed in claim 2 wherein said switching control means produces control signals selected from the family of functions called Walsh functions.

5. A receiver as claimed in claim 2 wherein said predetermined phase adjustment is substantially one-half the carrier cycle.

6. A receiver as claimed in claim 2 wherein said phase perturbation means comprises a switched delay line path.

7. A receiver as claimed in claim 2 wherein said phase perturbation means comprises a switched negative unity gain amplifier.

8. Received signal processing apparatus for use with a spatial diversity receiver having at least two physically separated receiving elements each producing a received signal comprising:

phase perturbation means for each receiving element to modulate the phase of the received signal selectively by a predetermined phase adjustment in response to a control signal, producing a phase perturbed output signal;

switching control means to produce a control signal for each phase perturbation means; and summing means to sum the outputs from all said phase perturbation means to produce a combined signal output.

9. A receiver as claimed in claim 8 wherein said switching control means produces control outputs that are periodic over a symbol period.

10. A receiver as claimed in claim 9 wherein said switching control means produces mutually orthogonal control outputs.

11. A receiver as claimed in claims 10 wherein said switching control means produces control outputs selected from the family of functions called Walsh functions.

12. A receiver as claimed in claims 8 wherein said predetermined phase adjustment is substantially one-half the carrier cycle.

13. A receiver as claimed in claim 8 wherein said phase perturbation means comprises a switched delay line path.

14. A receiver as claimed in claim 8 wherein said phase perturbation means comprises a negative unity gain amplifier.

* * * * *